United States Patent

[11] 3,632,467

[72] Inventors William D. Todd
 Bay Village;
 Thomas J. Doyle, Lorain, both of Ohio
[21] Appl. No. 29,734
[22] Filed Apr. 23, 1970
[45] Patented Jan. 4, 1972
[73] Assignee The B. F. Goodrich Company
 New York, N.Y.
 Continuation of application Ser. No.
 595,597, Nov. 21, 1966, now abandoned.
 This application Apr. 23, 1970, Ser. No.
 29,734

[54] UNCURED POLYVINYL CHLORIDE PLASTISOL TAPE COATED WITH PVC PLASTISOL ADHESIVE LAYER
 6 Claims, No Drawings

[52] U.S. Cl.......................................... 161/167,
 117/122 H, 117/122 PF, 117/138.8 A, 117/138.8
 UA, 117/161 R, 117/161 UZ, 117/161 ZB,
 161/184, 161/254, 161/256, 264/171, 264/212,
 264/216
[51] Int. Cl........................................ C09j 7/02,
 B32b 27/06

[50] Field of Search............................................. 161/165,
 167, 184, 254, 256, 406; 117/72, 161 ZB, 132 BE,
 138.8 UA, 138.8 A, 161 UB, 122 H, 122 PF, 76 A;
 260/837, 31.8 E, 31.8 R, 31.8 M; 156/330, 51-53

[56] References Cited
 UNITED STATES PATENTS

| | | | |
|---|---|---|---|
| 2,892,808 | 6/1959 | Shafer.......................... | 260/837 PV |
| 3,027,337 | 3/1962 | Tritsch......................... | 260/5 |
| 3,278,477 | 10/1966 | Evans........................... | 260/30.4 |
| 3,511,732 | 5/1970 | Brookfield et al............. | 161/256 X |

Primary Examiner—Willard E. Hoag
Attorneys—J. Hughes Powell, Jr. and Ernest K. Bean ABSTRACT: Vinyl plastisol compositions comprising composites of two different vinyl halide resin plastisols wherein there is an adhesive plastisol layer of a mixture of a vinyl halide resin, a liquid plasticizer therefor, a polyepoxide and an amine curing agent; and a plastisol layer of a mixture of a vinyl halide resin and a plasticizer therefor; in unitary adherent relation; are useful in bonding together diverse materials, for example, metal and vinyl surfaces, and glass and fabric surfaces.

UNCURED POLYVINYL CHLORIDE PLASTISOL TAPE COATED WITH PVC PLASTISOL ADHESIVE LAYER

This is a continuation of application Ser. No. 595,597, filed Nov. 21, 1966 and now abandoned.

This invention relates to vinyl plastisol compositions having improved adhesive properties and more particularly relates to unitary compositions of two different vinyl halide resin plastisols which, in the form of sheets and tapes, are capable of adhering to a variety of surfaces, and to methods for preparing said materials.

The novel vinyl chloride resin plastisol composites comprise an adhesive plastisol layer in a unitary adherent relation with a plastisol layer, the adhesive plastisol layer being characterized in that it comprises a mixture of polyvinyl chloride resin and a liquid plasticizer, a polyepoxide and an amine curing agent, and the plastisol layer, which is in adherent relation to the adhesive plastisol layer, which comprises a mixture of vinyl chloride resin and a plasticizer therefor. These composites are readily adhered to a variety of surfaces and may be used to bond together diverse materials which may not be satisfactorily bonded by either plastisol composition alone. For example, the adhesive plastisol surface will adhere tenaciously to metal and glass surfaces and a variety of porous and nonporous surfaces, even on unprimed metal surfaces, by merely heating at an elevated temperature. The plastisol surface may be joined to other surfaces as vinyl or fabric, particularly by heat sealing, solvent welding and the like to form unitary structures.

The composite structures may be prepared, for example, by first casting a film of the adhesive plastisol, which is described more fully hereinafter, onto a nonadhering surface, and while still wet, casting on top of this film, a film of a regular plastisol and heating the composite at a temperature sufficient to gel and unite the two plastisols, but not to cure the adhesive plastisol. After gelling, the layers of the two adhesive plastisols are in unitary and adherent relation and may be stripped as a unit from the nonadherent surface and cut to form sheets or strips which may be then rolled in the form of tape.

In a typical application, as for adhering glass and vinyl surfaces, tape, with the adhesive plastisol layer placed in contact with the glass surface, is heated for about 20 minutes at 400° F. to cure the adhesive plastisol layer and develop adhesion to the glass. The other surface, the plastisol, may be then joined for example to a vinyl surface by heat or by solvent welding, by treating the vinyl surfaces with tetrahydrofuran, pressing together and heating.

The plastisol may be cast first and the adhesive plastisol then cast thereover, the order is not important. Either of the two plastisols may be cast in film thicknesses from about 2 mils to 10 or more if desired, but normally in applications where the advantages of the two surface composite structures is desired, the thinner the film, the better for economic reasons. The total thickness of the composite is preferably less than 125 mils. It is essential that the two plastisols are placed one on the other before the adhesive plastisol layer is heated to such a temperature that curing takes place, because in such event, the two plastisols do not properly unite and the adhesive plastisol surface then will not adequately adhere to other surfaces. In the first step of gelling the two plastisols, the critical point, although time and temperatures are somewhat interrelated, is the temperature at which the two wet plastisols are heated. Those skilled in the art will understand that the term "gelling" means to heat a plastisol only to such temperature as to cause solidification so the plastisol can be handled, not heating to completely fuse or cure the plastisol and develop the ultimate physical properties. For example, two ungelled layers of plastisol, placed one over the other, with a melamine curing agent in the adhesive plastisol, heated to a film temperature above 200° F. but less than 350° F., preferably at about 250° F. to 300° F. enables one to obtain the proper adhesion between the two plastisols and sufficient gelling so that the structure may be handled and formed into sheets and tape. Such temperature must be below that at which a cure of the adhesive plastisol layer occurs. It will be understood, of course, that with thicker films, at constant heat more time may be required than with thinner films, or higher temperatures will be required. Particular embodiments would be, for example, with a 3-mil film of adhesive plastisol containing 5 parts of N,N-diallyl melamine and a 7-mil film of plastisol in adherent relation, heated for 30 seconds at 350° F. This time and temperature is adequate to gel the two plastisols and cause the necessary adhesion between the two plastisols but does not cause curing of the adhesive plastisol layer which would interfere with later curing reactions to obtain maximum adhesion of this surface and other surfaces. The gelling time and temperature for the composites is readily determined.

The polyvinyl chloride resins used are the homopolymers of vinyl chloride, copolymers and interpolymers of at least 70 percent by weight of vinyl chloride and up to about 30 percent by weight of one or more other vinyl monomers copolymerizable with vinyl chloride. For the purpose of this invention the other vinyl monomers which may be included in addition to the essential vinyl chloride in the polyvinyl chloride resins are those monomers having a

grouping. Such monomers include monoolefinically unsaturated monomers copolymerizable with vinyl chloride such as vinyl bromide, vinyl fluoride, vinylidene chloride, vinylidene bromide, vinylidene fluoride, chlorotrifluoroethylene, 1,2-dichloroethylene, tetrafluoroethylene, and the like; the vinyl esters such as vinyl acetate, vinyl propionate, vinyl butyrate, vinyl benzoate, vinyl laurate, isopropenyl acetate, isopropenyl caproate, and the like; the acrylate and methacrylate esters such as methyl acrylate, ethyl acrylate, propyl acrylate, isopropyl acrylate, the butyl acrylates, the amyl acrylates, the hexyl acrylates, the heptyl acrylates, the octyl acrylates, the dodecyl acrylates, phenyl acrylate, cyclohexyl acrylate, methyl methacrylate, ethyl methacrylate, the propyl methacrylates, the butyl methacrylates, the amyl methacrylates, the hexyl methacrylates, the heptyl methacrylates, the octyl methacrylates, the nonyl methacrylates, the decyl methacrylates, the dodecyl methacrylates, phenyl methacrylate, cyclohexyl methacrylate, and the like; the maleate and fumarate esters such as diethyl maleate, the dipropyl maleates, the dibutyl maleates, the diamyl maleates, the dihexyl maleates, the dioctyl maleates, the dilauryl maleates, dimethyl fumarate, diethyl fumarate, the dipropyl fumarates, the dibutyl fumarates, the diamyl fumarates, the dihexyl fumarates, the diheptyl fumarates, the dioctyl fumarates, the didecyl fumarates, dicyclohexyl fumarate, diphenyl fumarate and the like; the vinyl aromatic monomers such as styrene, alpha-methyl styrene, the vinyl toluenes, the vinyl xylenes, vinyl naphthalene, and the like; the monoolefins such as ethylene, propylene, the butylenes, the amylenes, the hexylenes, cyclohexene, and the like; the vinyl ethers such as vinyl methyl ether, vinyl ethyl ether, the vinyl propyl ethers, the vinyl butyl ethers, the vinyl amyl ethers, the vinyl hexyl ethers, the vinyl heptyl ethers, the vinyl octyl ethers, vinyl cyclohexyl ether, vinyl phenyl ether, vinyl benzyl ether, and the like; the allyl esters and ethers such as allyl acetate, allyl laurate, allyl benzoate, allyl methyl ether, allyl ethyl ether and the like; vinyl cyanides such as acrylonitrile, methacrylonitrile, vinylidene cyanide and the like and others.

Most preferred are the interpolymers of from 70 to 100 percent by weight of vinyl chloride and from 0 to 30 percent by weight of at least one other monomer selected from the group consisting of

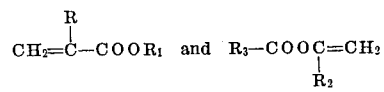

wherein R is a member of the group consisting of hydrogen and an alkyl group having from one to four carbon atoms, $R_1$ is a hydrocarbon group having from one to 12 carbon atoms, $R_2$ is a member selected from the group consisting of hydrogen and an alkyl group having one to four carbon atoms and $R_3$ is a hydrocarbon group having from one to 12 carbon atoms. Even more preferred are the monomers in which $R_1$ and $R_3$ in the above formulas are alkyl groups having from one to eight carbon atoms. Most preferred in this invention is an emulsion polymerized, dispersion grade homopolymer of vinyl chloride, having a particle size range of from about 0.2 μ to about 4 μ.

The plasticizers useful in both plastisol compositions include the phthalates, adipates, sebacates, azelates and the like which are generally considered primary plasticizers for polyvinyl chloride resins. Specific examples include, for example, di(2-ethyl hexyl)phthalate, dioctyl phthalate, dinonyl phthalate, diisodecyl phthalate, octyldecyl phthalate, dicapryl phthalate, butyl decyl phthalate, dicyclohexyl phthalate, butylbenzyl phthalate, butyloctyl phthalate, tricresyl phosphate, octyl decyl phosphate, cresyl diphenyl phosphate, trioctyl phosphate, dioctyl adipate, dicapryl adipate, dioctyl sebacate, dioctylazelate. Useful plasticizers are generally liquid plasticizers and are alkyl and alkoxy alkyl esters of dicarboxylic acids or the esters of polyhydric alcohols and monobasic acids. Most preferred are the liquid diesters of aliphatic alcohols containing from four to 20 carbon atoms and dibasic carboxylic acids containing from six to 14 carbon atoms. The amounts of plasticizer may be varied from about 20 to 150 parts per 100 parts of vinyl chloride resin, preferably about 40 to 100. Secondary plasticizers such as the recinoleates and ethylene glycol derivatives and polymeric or linear-type polyesters may also be used.

The polyepoxides used in the adhesive plastisol layer are compounds having a plurality of vicinal epoxy groups,

They may be saturated or unsaturated, aliphatic, cycloaliphatic, aromatic or heterocyclic and may be substituted, if desired, with noninterfering substituents, such as chlorine atoms, hydroxyl groups, ether radicals, and the like. They also may be monomeric or polymeric.

The monomeric type of polyepoxide includes, for example, vinyl cyclohexene dioxide, epoxidized glycerides, as epoxidized soybean oil, butadiene dioxide, 1,4-bis(2,3-epoxy propyl) benzene, 1,3-bis(2,3-epoxy propoxy)benzene, 4,4'-bis(2,3-epoxy propoxyl) diphenyl ether, 1,8-bis(2,3-epoxy propoxy)octane, 1,4-bis(2,3-epoxy propoxy)cyclohexane, 4,4'-bis(2-hydroxy-3,4-epoxy butoxy)diphenyl dimethyl methane, 1,3-bis(4,5-epoxy pentoxy)-5-chlorobenzene, 1,4-bis(3,4-epoxy butoxy)-2-chlorocyclohexane diglycidyl ether, 1,3-bis(2-hydroxyl-3,4-epoxy butoxy)benzene, 1,4-bis(2-hydroxy-4,5-epoxy pentoxy)benzene, 1,2,5,6-diepoxy-3-hexyne, 1,2,5,6-diepoxy hexane, 1,2,3,4-tetra(2-hydroxy-3,4-epoxy butoxy)butane, and epoxy-substituted materials obtained by reacting diisocyanates with glycidol; the glycidyl esters of polycarboxylic acids, or esters of diepoxide-substituted acids, such as diglycidyl phthalate, diglycidyl adipate, diglycidyl maleate, dibutyl ester of epoxidized dimerized linoleic acid, the glycidyl polyethers of polyhydric phenols obtained by reacting a polyhydric phenol with an excess of a halogen-containing epoxide in an alkaline medium. Thus, 2,2-bis(2,3-epoxy propoxy phenyl)propane is obtained be reacting bis-phenol, (2,2-bis(4-hydroxy-phenyl)propane), with an excess of epichlorohydrin. Other polyhydric phenols that can be used for this purpose include resorcinol, or polynuclear phenols, such as 2,2-bis(4-hydroxy phenyl)butane, 4,4'-dihydroxy benzophenone, bis(4-hydroxyl phenyl)ethane, and 1,5-dihydroxy naphthalene. The halogen-containing epoxides may be further exemplified by 3-chloro-1,2-epoxy butane, 3-bromo-1,3-epoxy hexane, 3-chloro-1,2-epoxy octane, and the like.

Examples of the polymeric type of polyepoxides include the polyepoxy polyhydroxy polyethers obtained by reacting, preferably in an alkaline or an acid medium, a polyhydric alcohol or a polyhydric phenol with a polyepoxide such as the reaction product of glycerol and bis(2,3-epoxy propyl)ether, the reaction product of sorbitol and bis(2,3-epoxy-2-methyl propyl)ether, the reaction product of pentaerythritol and 1,2-epoxy-4,5-epoxy-pentane, and the reaction product of bis-phenol and bis(2,3-epoxy-2-methyl propyl)ether, the reaction product of resorcinol and bis(2,3-epoxy propyl)ether, and the reaction product of catechol and bis(2,3-epoxy propyl)ether, the hydroxy-substituted polyepoxy polyethers obtained by reaction, preferably in an alkaline medium a slight excess, e.g., 0.5- to 3-mole excess, of a halogen-containing epoxide as described above, with any of the aforedescribed polyhydric phenols, such as resorcinol, catechol, bis-phenol, bis(2,2'-dihydroxy-dinaphthyl)methane, and the like; polyepoxy polyethers obtained by reacting, preferably in the presence of an acid-acting compound, such as hydrofluoric acid, one of the aforementioned halogen-containing epoxides with a polyhydric alcohol, such as glycerol, propylene glycol, ethylene glycol, trimethylene glycol, butylene glycol, and the like, and subsequently treating the resulting product with an alkaline component; and polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light, and the like, they undergo addition polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and the like. Illustrative of these polymers are poly(allyl-2,3-epoxypropyl ether), poly(2,3-epoxy propyl crotonate), allyl-2,3-epoxy propyl ether-styrene copolymer, poly(vinyl-2,3-epoxy propyl ether), allyl glycidyl ether vinyl acetate copolymer and poly(4-glycidyloxystyrene).

Particularly useful in the adhesive plastisol are the low molecular weight, liquid glycidyl polyethers of dihydric phenols obtained by reacting epichlorohydrin with a dihydric phenol in an alkaline medium. The monomeric products of this type may be represented by the general formula

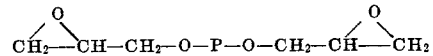

wherein P represents a divalent hydrocarbon radical of the dihydric phenol. The polymeric products will generally not be a single simple molecule but will be a complex mixture of glycidyl polyethers of the general formula

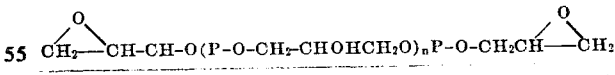

wherein P is a divalent hydrocarbon radical of the dihydric phenol and $n$ is an integer of the series 0, 1, 2, 3, etc. While for any single molecule of the polyether, $n$ is an integer, the fact that the obtained polyether is a mixture of compounds causes the determined value for $n$ to be an average which is not necessarily zero or a whole number. The polyethers may, in some cases, contain a very small amount of material with one or both of the terminal glycidyl radicals in hydrated form.

A specific example of a useful liquid polyepoxide is Epon 828, a pourable (160 poises at 25° C.), liquid epoxy resin having a melting point of 8°–12° C. and an epoxide equivalency of 190 to 210 and is formed by reaction of 4,4'-dihydroxy-diphenyl propane and epichlorohydrin in a molar ratio, respectively of about 1:2. Epon 562 is substantially Epon 828 plus a mixture of glycerol and epichlorohydrin and having a viscosity of about 0.8 poise at room temperature. Similar polyepoxides may also be used.

Other useful types of polyepoxides are diisodecyl 4,5-epoxytetrahydrophthalate and epoxidized soybean oil. The methods for preparing them are set out in U.S. Pat. Nos. 2,581,464, 2,260,753 and 2,327,053 and in Chemical Week, Vol. 69, page 27, for Sept. 8, 1951.

While the usual curing agents used with polyepoxides, particularly amines, as diethylene triamine, m-phenylene diamine, and the like may be used in the adhesive plastisol. Good results are obtained with certain melamines, hexamethylene tetramine, polymeric amines, and the like. The melamine curing agents all contain at least two primary amine groups per molecule and may be generally described as melamines having the formula

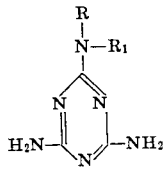

wherein R and $R_1$ may be the same or different and R and $R_1$ is each selected from the group consisting of hydrogen and a hydrocarbon group having from one to eight carbon atoms. Most preferred are curing agents of the foregoing formula wherein R and $R_1$ is each selected from the group consisting of hydrogen, an aliphatic hydrocarbon group having from one to eight carbon atoms and an olefin group free of aromatic double bonds having from two to eight carbon atoms. Illustrative curing agents of the type embodied herein are found in U.S. Pat. No. 3,278,477.

In general the adhesive plastisol compositions embodied herein may contain from about 60 to about 150 parts by weight of combined liquid plasticizer and polyepoxide per 100 parts by weight of the polyvinyl chloride resin. The foregoing liquid component contains from 20 to 70 percent by weight of the polyepoxide and from 80 to 30 percent by weight of plasticizer.

The amount of amine curing agent required to cure a given polyepoxide is usually expressed in terms of equivalents. Epon 828, for instance, has an equivalent weight of 195 and 50 grams of Epon 828 would represent 0.256 equivalents of epoxy. N,N-Diallyl melamine, for instance, has an equivalent weight of 51 and the theoretical amount of N,N-diallyl melamine needed to react completely with 50 grams of Epon 828 would be the product of 51 and 0.256 or 13.06 grams of the melamine. In practice, it has been found that from about 30 to about 300 percent of the theoretical equivalent weight of amine curing agent may be used. In applications where the thickness of the adhesive plastisol is from about 1 to 8 mils thick a level of from about 150 percent to about 300 percent of the theoretical equivalent amount of amine curing agent may be used. In applications where the adhesive plastisol is used in thicker applications, from 40 to 60 percent may be used. In general, from about 75 to 150 percent is used.

Pigments, fillers, stabilizers and the like normally used by those skilled in the art in plastisol formulations may be incorporated in both the plastisol compositions. The customary heat and light stabilizers are also used.

It is preferred to use in the plastisols from about 0.5 to about 5 parts by weight based on the weight of the polyvinyl chloride resins of a basic vinyl stabilizer. Most preferred is a level of from about 1 to about 3 parts of an inorganic basic lead stabilizer such as basic lead carbonate, dibasic lead phosphite, dibasic lead phthalate, tribasic lead sulfate, lead salicylate, lead stearate, dibasic lead stearate, tribasic lead maleate and basic lead silicate. For a more complete discussion of the use of lead stabilizer in polyvinyl chloride resins see "Rubber and Plastics Weekly," July 15, 1961, pages 82-83. Most preferred of the inorganic basic lead salts because of its relative cheapness and ready availability is basic lead carbonate which also unexpectedly enhances the cure rate of the plastisol compositions.

The method of making the adhesive plastisol compositions is not critical. It is usually desirable to disperse well the melamine curing agent and the stabilizer in a portion of the plasticizer and then mix the remainder of the plasticizer and the dispersion with the polyvinyl chloride resin at room temperature or slightly above in any conventional mixing equipment. Pigments, fillers, coloring agents and the like may be incorporated into the plastisol by conventional means.

Also, the method of making the normal plastisol compositions of the invention is not critical and they may be prepared by any of the methods well known to those skilled in the art. Normally, some or both of the compounding ingredients will be mixed with the plasticizer which is then mixed with the remainder of the plasticizer and polyvinyl chloride in conventional mixing equipment. The plastisols are generally prepared by simple mixers such as planetary. Paste techniques are described in Chapter XIV of the "Polymer Processes" edited by Schildknecht, Interscience Publishers, 1956.

The plastisols are stable for temperatures up to 100° F. and higher. Films and coatings of the composite of this invention are cured and are fused to develop the ultimate physical properties usually by heating at a temperature of from about 325° F. to about 410° F. for from about 10 to 40 minutes.

In a typical embodiment of the invention two plastisol formulations were prepared according to the following recipes. The adhesive plastisol contained

| | |
|---|---|
| Plastisol grade polyvinyl chloride[1] | 100 |
| $TiO_2$ (67%) paste | 75 |
| N,N-diallyl melamine (60%) paste | 8.7 |
| Dicyandiamide (50%) paste | 12.75 |
| Green pigment (40%) paste[2] | 5 |
| CIBA 6005 epoxy[3] | 75 |
| Dioctyl phthalate | 25 |
| Cardinal Clear No. 7 Stabilizer[4] | 2 |
| Salol[5] | 3 |

[1]Geon 121 paste resin

[2]Phthalocyanine green

[3]Bis-phenol A—epichlorohydrin polymer

[4]Polymeric tin mercaptide

[5]Phenyl salicylate

The dioctyl phthalate, stabilizer and Salol heated together and added to the other ingredients already present in an internal mixer.

The regular plastisol formulation was prepared according to the following recipe.

| | |
|---|---|
| Plastisol grade polyvinyl chloride[1] | 100 |
| Dioctyl phthalate | 60 |
| Paraplex G-62[2] | 5 |
| Thermolite 31[3] | 1 |
| Red pigment paste (20%)[4] | 1 |

[1]Geon 121 paste resin

[2]Epoxidized soya oil

[3]Tin mercaptide

[4]Cadmium selenide

These materials were also blended together in an internal mixer.

The adhesive plastisol formulation was spread on a Teflon-coated steel sheet with a 3-mil draw bar and a film of the regular plastisol was deposited thereover with a 10-mil draw bar, this layer being 7 mils thick. The wet film was heated for 30 seconds at 350° F. to gel the films. After cooling the film was readily stripped from the Teflon-coated steel. The film was then cut in to strips and a strip portion was then placed on a piece of glass with the adhesive plastisol surface on the glass. The glass and plastisol composite was then heated for 19 minutes at 400° F. to cure the adhesive plastisol and develop adhesion to the glass. A strip of polyvinyl chloride coated fabric was then placed on the plastisol surface under a pressure of 35 pounds at a temperature of 400° F. and for 2 minutes to provide a heat seal. Dielectric heating was also used. The resulting composite formed a unitary structure which could not be pulled apart by hand and required over 15 pounds per lineal inch to separate the individual components. Other films were similarly prepared wherein the adhesive plastisol layer was 6 mils in thickness and the plastisol 15 mils in thickness.

Other methods of use of the novel compositions include, after the film is cast and gelled, diecutting gaskets, sealing rings and the like from the sheet. Other methods of application of the two plastisol layers may be used other than casting, such as spraying, printing and stenciling. In other applications, it may be desirable to form the composite directly on one of the surfaces to be joined as by casting the adhesive plastisol layer on a metal surface, casting the other plastisol next, and then heating to gel the plastisols, and, if desired, sufficient heating to both gel the two plastisols and cure the adhesive plastisol layer to the metal surface. Metals, glass and fabrics and other fibrous materials may be adhered by means of the composition of this invention. Further advantage may be taken of the plastisol layer by adding flocking, or applying special finish effects known to those skilled in the art, which may be made on the regular plastisol layer surface either before or after the adhesive plastisol layer is adhered to another surface as a metal.

We claim:

1. A composite film structure of from 4 to less than 125 mils thick of two different vinyl chloride resin plastisols in adherent relation adapted to adhere to a variety of surfaces comprising (A) a first film layer at least 2 mils thick of a gelled adhesive vinyl chloride resin plastisol composition comprising as essential ingredients:
   1. vinyl chloride paste resin,
   2. a plasticizer for the vinyl chloride resin,
   3. a polyepoxide containing a plurality of vicinal epoxy groups, and
   4. an amine curing agent there being present in said composition:
   a. from 60 to 150 parts by weight of (2) and (3) combined for each 100 parts by weight of (1)
   b. from 20 to 70 percent by weight of (3) based on the total of (2) and (3), and
   c. from 30 to 300 percent of an equivalent weight of (4) based on the number of vicinal epoxy equivalent weights in (3);

in adherent relation to (B) a second film layer, said second film layer comprising a gelled mixture of a vinyl chloride resin and a liquid plasticizer therefor, prepared by casting a film of at least 2 mil thickness of (A) or (B) and before heating to gel, casting on top of this film a film of at least 2 mil thickness of (B) or (A) to form a composite (A) (B) and heating at a temperature above 200° F. to gel and unite said first and said second film layers (A) and (B) but below 350° F. so that the adhesive plastisol layer (A) is not cured.

2. The composite of claim 1 wherein the plasticizers are diesters of dicarboxylic acids.

3. A composite of claim 1 comprising as essential ingredients in parts by weight in (A) (1) 100 weight parts of polyvinyl chloride, (2) 20 to 35 weight parts of a plasticizer selected from the class consisting of dialkyl phthalates and dialkyl adipates each having from four to eight carbon atoms in each alkyl group, (3) 50 weight parts of a liquid polyepoxide reaction product of about 1 mol of 4,4'-dihydroxydiphenyl propane and about 20 mols of epichlorohydrin having epoxide equivalency of about 190 to 210, (4) 4 to 12 weight parts of N,N-diallyl melamine, and in (B) 100 weight parts polyvinyl chloride resin and 40 to 125 weight parts of an ester plasticizer therefor.

4. The composite of claim 1 wherein (3) is a liquid polyepoxide being a compound of the formula:

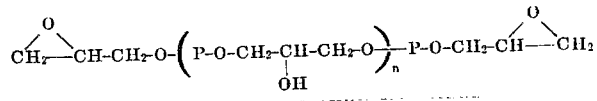

where P is

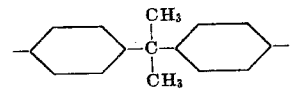

and $n$ is a number from 0 to 3; and (4) is a melamine compound of the formula

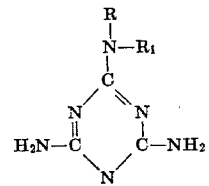

wherein R is an aliphatic hydrocarbon of one to eight carbon atoms and $R_1$ is selected from the class consisting of R and hydrogen.

5. The composite of claim 4 wherein the melamine curing agent is an N,N-dialkylmelamine containing one to four carbon atoms in each alkyl group.

6. The composite of claim 4 wherein there is 75 to 150 percent of an equivalent weight of (3).

* * * * *

PO-1050
(5/69)

UNITED STATES PATENT OFFICE
CERTIFICATE OF CORRECTION

Patent No. 3,632,467　　　　　　　Dated January 4, 1972

Inventor(s) William D. Todd and Thomas J. Doyle

It is certified that error appears in the above-identified patent and that said Letters Patent are hereby corrected as shown below:

Column 8, line 14, Claim 3, "20" should read ---2---.

Signed and sealed this 8th day of May 1973.

(SEAL)
Attest:

EDWARD M. FLETCHER, JR.　　　　　　　ROBERT GOTTSHCALK
Attesting Officer　　　　　　　　　　Commissioner of Patents